United States Patent [19]
Imura

[11] 3,887,929
[45] June 3, 1975

[54] SINGLE LENS REFLEX CAMERA LIGHT MEASURING SYSTEM

[75] Inventor: Toshinori Imura, Osaka, Japan

[73] Assignee: Minolta Camera Kabushiki Kaisha, Osaka, Japan

[22] Filed: Mar. 27, 1973

[21] Appl. No.: 345,353

[30] Foreign Application Priority Data
Mar. 31, 1972 Japan............................... 47-31634

[52] U.S. Cl. ..................... 354/46; 354/47; 354/272
[51] Int. Cl. ............................................. G03b 7/20
[58] Field of Search ............. 95/10 CT, 10 C, 64 B; 354/46, 47, 270, 272

[56] References Cited
UNITED STATES PATENTS

| | | | |
|---|---|---|---|
| 3,533,348 | 10/1970 | Yanagi | 95/20 CT X |
| 3,678,823 | 7/1972 | Sato | 95/10 CT |
| 3,691,917 | 9/1972 | Uchida et al. | 95/64 B |
| 3,712,194 | 1/1973 | Yoshimura | 95/10 CT |
| 3,721,168 | 3/1973 | Noack et al. | 95/10 C |

Primary Examiner—Samuel S. Matthews
Assistant Examiner—E. M. O'Connor
Attorney, Agent, or Firm—Watson, Cole, Grindle & Watson

[57] ABSTRACT

Correct exposure control signals are generated either with the diaphragm aperture fully opened or adjusted to a preset aperture setting at the time of light measurement. With the diaphragm aperture fully opened the preset aperture setting is provided to the light measuring device to adjust its output. Prior to the commencement of exposure the diaphragm is automatically adjusted to the reduced aperture setting. When the diaphragm aperture has been set to a given aperture setting the aperture setting data is excluded from the light measuring system.

9 Claims, 9 Drawing Figures

FIG. IA
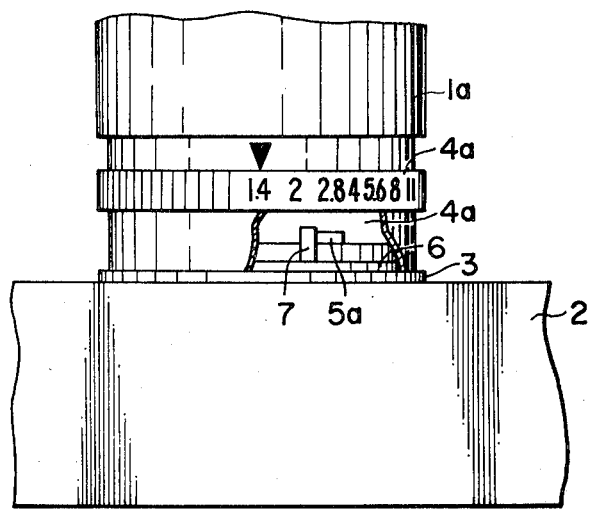
FIG. IB
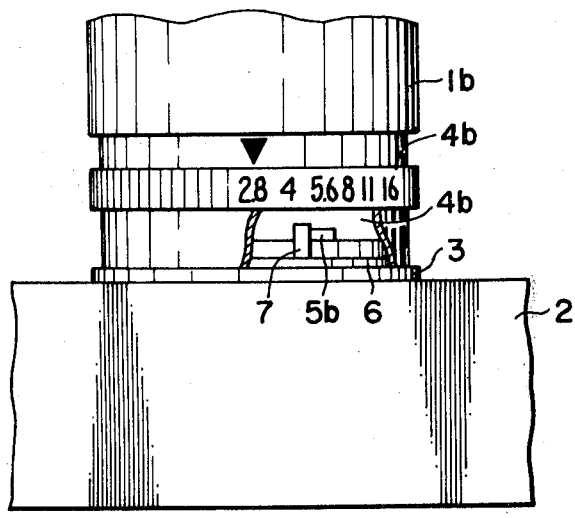

SINGLE LENS REFLEX CAMERA LIGHT MEASURING SYSTEM

BACKGROUND OF THE INVENTION

This invention relates to a light measuring system for use in a single lens reflex camera, and more particularly to a light measuring system wherein a light measuring device generates a correct exposure control signal when the diaphragm is opened at the time of light measurement or when the diaphragm has been adjusted to a preset aperture setting.

In focusing an object to be photographed with a single lens reflex camera, to maintain the diaphragm in the opened condition brightens an image on the focusing plate and minimizes the depth of focus, hence it is required that the diaphragm is maintained opened in the viewing condition of the camera. Subsequently, the diaphragm is adjusted to a preset aperture setting when the exposure is effected. This is hereinafter referred to as a first photographing system. The first photographing system has a mechanism so adapted that even if a value of aperture is already given, the diaphragm is maintained in the opened condition when the camera is in the viewing condition and in association with the release operation the diaphragm is adjusted to the aperture setting, after which exposure is effected.

In this case, if a light measuring device is used for receiving and measuring field light rays coming through the photographing lens and the diaphragm, it is imperative that the light measuring device provides, on the basis of the value of measured light when the diaphragm is opened, the exposure value corresponding to the light rays passing through the reduced aperture setting. It is known that such light measurements can be obtained by providing the aperture settings as inputs to the light measuring device.

In focusing the single lens reflex camera, however, to maintain the diaphragm in the opened condition as described results in the variation in the depth of focus for the actual photograph. Accordingly, it is also required that, when the camera is in the viewing condition for focusing, the diaphragm is adjusted from the opened condition to a set aperture, which may be referred to as a second photographing system. For this purpose the single lens reflex camera incorporates a diaphragm operating member manipulated to adjust the diaphragm to a set value.

In the second photographing system, if the light measuring device is used for effecting light measurement, in order to obtain a correct value of exposure, it is necessary that focusing be first effected by the operation of the diaphragm operating member, then followed by light measurement by releasing the diaphragm operating member so as to return the diaphragm to the opened condition, thereby obtaining an exposure value. Such procedures are extremely awkward for photographers, and in addition, should the photographer fail to effect the light measurement after the diaphragm has been adjusted to the opened position and the light measurement be effected as the diaphragm is maintained at the reduced aperture setting, it would be the same result as if a double operation using aperture setting had been performed, and this will lead to an error in the exposure value.

OBJECTS OF THE INVENTION

A principal object of this invention is to provide a light measuring system for use in a single lens reflex camera which obviates the defects as described above and which provides a correct exposure for the aperture setting, either in the firstly mentioned photographing system wherein the diaphragm is opened during the viewing condition of the camera and at the time of exposure the diaphragm is automatically adjusted to a reduced aperture setting prior to the commencement of exposure, or in the secondly mentioned photographing system in which the diaphragm is adjusted to a reduced aperture setting in the viewing condition of the camera, after which the exposure is effected.

Another object of the invention is to provide a light measuring system for use in a single lens reflex camera which is capable of indicating a correct value of exposure or controlling exposure automatically with the photographing system being switched between the first and second photographing systems.

A further object of this invention is to provide a light measuring system for use in a single lens reflex camera, wherein in case of the first photographing system, the aperture setting is fed as an input to a light measuring device for effecting the operating thereof, and wherein the aperture setting is excluded with the switching of the camera to the second photographing system, while the other exposure factors and the light measuring outputs are used in controlling exposure.

A still further object of this invention is to provide a light measuring system for use in a single lens reflex camera, wherein in association with the switching of the camera from the first photographing system to the second photographing system, a light measuring device for use in receiving field light rays coming through a photographing lens and a diaphragm is switched so as to indicate or control a correct value of exposure with each photographing system.

These and other objects of this invention will be apparent from the following description in conjunction with the accompanying drawings.

SUMMARY OF THE INVENTION

The invention comprises means for setting a diaphragm aperture, and means for adjusting the diaphragm to an aperture setting. The camera is changed from the viewing condition to the exposure condition. A light measuring system comprises a converting mechanism for transmitting the aperture setting to the light measuring device. The converting mechanism is arranged to generate a correct value of exposure when the camera is in the exposure condition on the basis of the light measuring outputs when the camera is in the viewing condition where the diaphragm is opened. A diaphragm operating member is manipulated to adjust the diaphragm to an aperture setting when the camera is in the viewing condition. The diaphragm operating member is associated with the converting mechanism to feed as inputs the aperture settings to the light measuring device. The converting mechanism, when the diaphragm is set at the desired aperture setting by the diaphragm operating member with the camera in the viewing position, excludes the aperture setting data from the light measuring device.

BRIEF DESCRIPTION OF THE DRAWINGS

FIGS. 1A and 1B are fragmentary elevational views showing an aperture setting member and a transmission mechanism for an interchangeable lens type of camera, wherein FIG. 1A shows the interchangeable lens set to an aperture value of F:1.4, and FIG. 1B shows the interchangeable lens set to an aperture value of F:2.8;

DETAILED DESCRIPTION OF THE INVENTION

Figure 2:
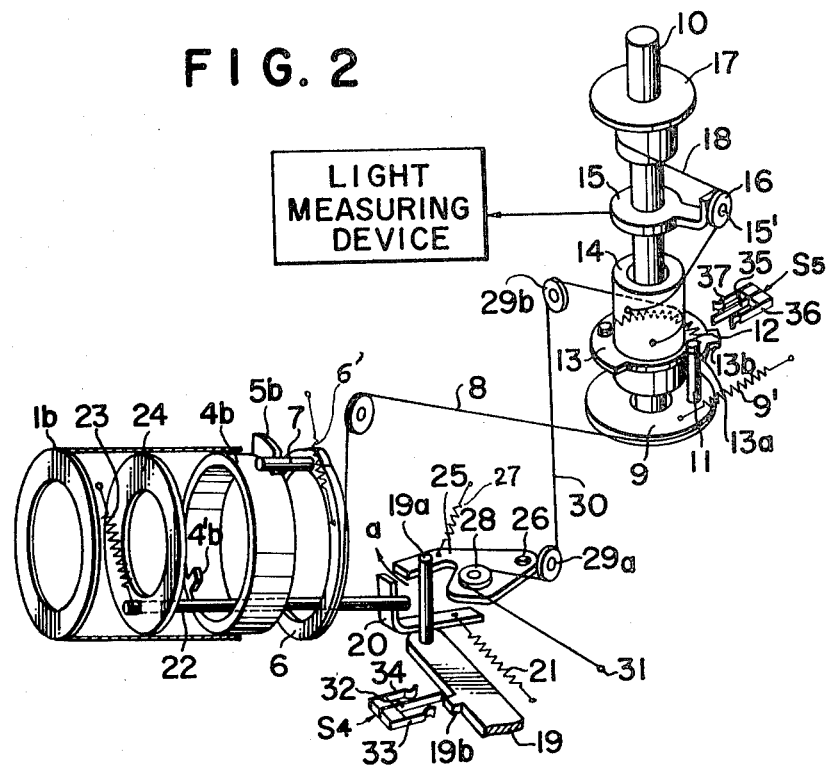
FIG. 2 is a perspective view of an essential part of a first embodiment of this invention, illustrating an operating member in a viewing condition prior to actuation.

FIGS. 1A and 1B show interchangeable lenses 1a and 1b mounted on support 3 of camera body 2; each of the lenses is set to a different aperture setting, for example, F:1.4 and F:2.8, respectively.

Either of interchangeable lenses 1a, 1b is mounted on the camera body with its aperture opened. Aperture setting rings 4a and 4b of respective interchangeable lenses 1a and 1b are provided with inwardly extending projections 4a', 4b' (FIG. 2) and radially outwardly projecting meter couplers 5a, 5b. Meter couplers 5a and 5b take a constant position with respect to the camera body 2 when the aperture setting ring is mounted to the camera body. Pin 7 of coupling ring 6 is rotatably connectable to camera body 2 and also is at a constant position when it engages meter couplers 5a or 5b, because coupling ring 6 is urged in a counterclockwise direction by spring 6' as shown in FIG. 2.

Now, on the assumption that interchangeable lens 1b is mounted on camera body 2, there is a first photographing system in FIG. 2, wherein when light measurement is effected, part of the field light rays passing through a photographing lens and a diaphragm in the opened condition are received by a light receiving element of a light measuring device. If aperture setting ring 4b is rotated in the clockwise direction in FIG. 2 from f-stop F:2.8 to f-stop F:5.6, meter coupler 5b of ring 4b causes coupling ring 6 to rotate by an equal angle in the same direction via pin 7.

First transmission string 8 having one end secured to an outer circumference of coupling ring 6 and wound therearound in the counterclockwise direction extends, by way of a pulley having a fixed pin, around diaphragm adjusting pulley 9 in the counterclockwise direction and is secured at the other end to pulley 9. Accordingly, the clockwise rotation of coupling ring 6 and pin 7 causes the clockwise directional rotation of diaphragm adjusting pulley 9 against the force of spring 9'. One end of spring 12 is connected to adjusting disc plate 13 loosely fitted to shaft 10, by which diaphragm adjusting pulley 9 is journaled. Spring 12 has its other end connected to pin 11 projecting upwardly from diaphragm adjusting pulley 9. Disc plate 13 is adapted to rotate to normally engage and end wall of cut-away portion 13a thereof with upwardly projecting pin 11. Adjusting disc plate 13 has an outer peripheral face formed with a pulley and sleeve 14 loosely fitted to shaft 10 and formed integrally therewith.

Second transmission string 18 has one end attached to sleeve 14 and wound therearound in the counterclockwise direction and extends over planetary pulley 16 to film sensitivity setting pulley 17 and is wound therearound in the clockwise direction, then its other end is secured to the pulley. Planetary pulley 16 is rotatably journaled by shaft 15' projecting radially outwardly from an arm radially extending from disc 15 rotatably loosely fitted to shaft 10.

Accordingly, if a rotational position of film sensitivity setting pulley 17 with respect to shaft 10 is determined according to the film sensitivity, the rotational angle of adjusting disc plate 13 will afford a rotation of planetary pulley 16 about shaft 10 by way of second transmission string 18. And the angular position of disc 15 with respect to shaft 10 is fed as an input to the light measuring device.

Simultaneously therewith, the rotation of film sensitivity setting pulley 17 provides a rotation of planetary pulley 16 about shaft 10 with the resulting rotation of disc 15. The angular position of disc 15 relative to shaft 10 is representative of the film sensitivity and the aperture setting, and is fed as an input to the light measuring device.

Figure 4:
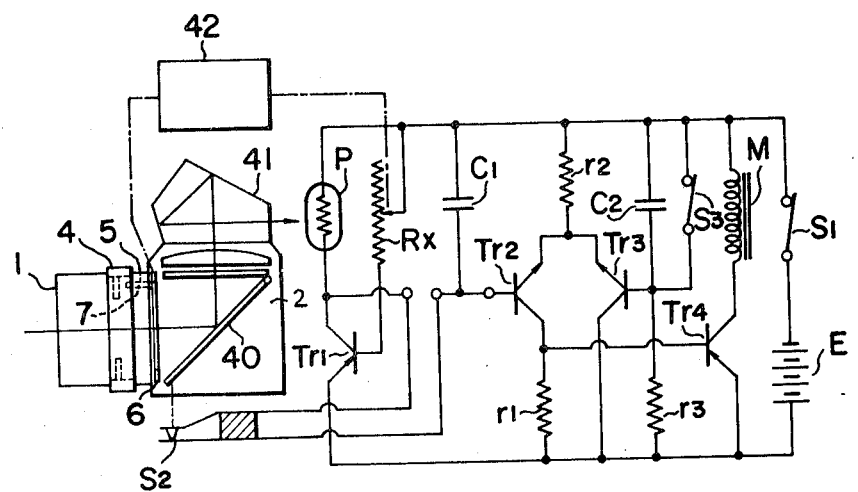
FIG. 4 is an example of an electric circuit used in the first embodiment.

Referring to the light measuring device in conjunction with FIG. 4, camera 2, diagrammatically shown on the left side of an electric circuit, is of the single lens reflex type wherein there is provided an interchangeable lens normally set to an opened aperture, and field light rays passing through the lens and the diaphragm are reflected by swingable mirror 40 to pass through a pentaprism to light receiving element P. Shown by frame 42 is the operation of the converting mechanism shown in FIG. 2.

A base of transistor Tr1 is connected through power source switch S1 and variable resistor Rx to a negative pole of power source E, and a collector of transistor Tr1 is connected through light receiving element P to power source switch S1. The emitter of transistor Tr1 is connected to a positive pole of power source E, thus constituting a light measuring circuit. The resistance of variable resistor Rx is determined in accordance with the angular position of disc 15 by means of operation mechanism 42 as shown in FIG. 2.

The collector of transistor Tr1 is also connected, through switch S2 adapted to be closed when movable mirror 40 is in the viewing position and opened when mirror 40 is swung to the photographing position, to storage capacitor C1 which is connected to the negative side of the power source and to a base of transistor Tr2. The collector of transistor Tr2 is connected through variable resistor r1 to the positive pole of the power source and a base of transistor Tr4. Thus, transistor Tr2, together with transistor Tr3, comprises a differential amplifying circuit, and the emitters of both transistors Tr2 and Tr3 are connected through resistor r2 to the positive side of the power source.

The base of transistor Tr3 is connected to junction CR of an integrating circuit composed of capacitor C2 and resistor R3, and connected across capacitor C2 to trigger switch S3 normally closed and adapted to be opened upon the commencement of shutter exposure. Electromagnet M for actuating the shutter is connected to the collector of transistor Tr4.

Figure 3:
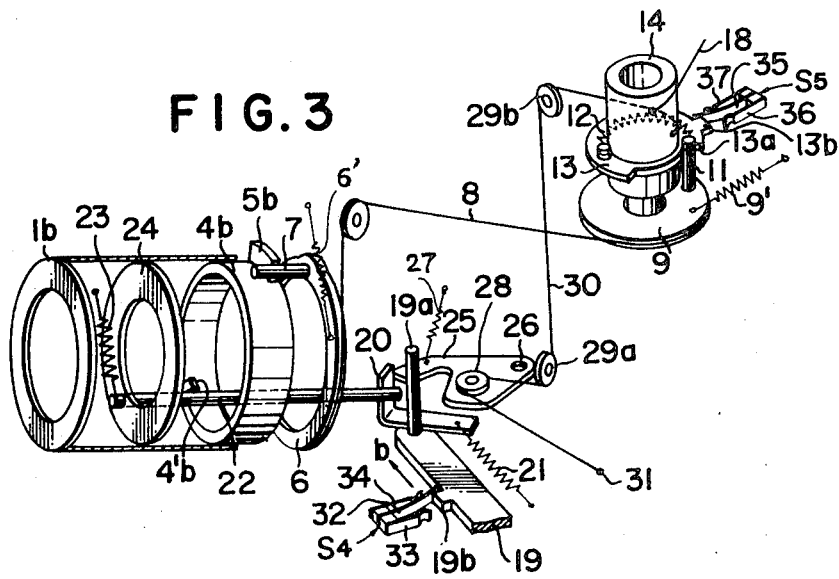
FIG. 3 shows the operating member in the operated condition.

In FIGS. 2 and 3, interconnecting pin 22 is rigidly attached to diaphragm adjusting ring 24 having a tendency to be rotated in the clockwise direction by spring 23. Interconnecting pin 22 extending to the camera body into engagement with diaphragm actuating lever 20 has spring 21 connected at one end thereto. Interconnecting pin 22 is adapted to rotate by the action of the spring in the counterclockwise direction against the force of spring 23, thereby opening the aperture and adapted to rotate, upon the release operation, in the clockwise direction, with the shift of the diaphragm actuating lever 20 in the direction of arrow $a$ by means of a known mechanism, until pin 22 in brought into engagement with projection 4$b'$ of rotating aperture setting ring 4$b$, thus adjusting the diaphragm to a preset aperture setting.

With such an arrangement, storage capacitor C1 is charged according to the field light rays coming through the photographing lens and the opened aperture, the film sensitivity and aperture settings. When rotatable mirror 40 is swung to the photographing position by the release operation, switch S2 is opened to thereby cut off the connection between light receiving element P and storage capacitor C.

Moreover, diaphragm actuating lever 20 is shifted in the direction of arrow $a$ by the release operation to rotate diaphragm adjusting ring 24 until interconnecting pin 22 engages projection 4$b'$, thereby adjusting the diaphram to a set aperture. When the shutter is released, trigger switch S3 is opened and the charging of capacitor C2 starts. When capacitor C2 is charged to a voltage level equal to that of storage capacitor C1, transistor T$r$2 is made conductive, and then transistor T$r$4 becomes conductive to energize electromagnet M, thereby actuating shutter closing.

Accordingly, even if light measurement is effected with the diaphragm fully opened, it is possible to control the exposure as if the diaphragm had been adjusted to a preset aperture setting.

Figure 5:
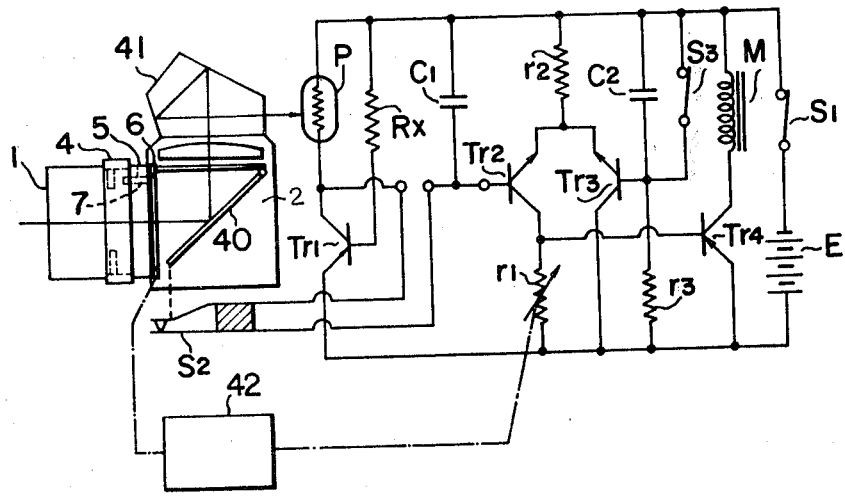
FIG. 5 is another example of the electric control circuit.

In the embodiment of FIG. 4, aperture setting and the film sensitivity data vary the bias voltage of transistor T$r$1 in the light measuring circuit, whereby the light measuring output is varied in accordance with that data. In the embodiment of FIG. 5, variable resistor $r$1 connected to the collector of transistor T$r$2 of the differential amplifying circuit is varied in accordance with the above data, so as to change the level of a switching circuit, thereby controlling exposure in accordance with the diaphragm adjusted to a given aperture setting.

The following description relates to the second photographing system wherein the diaphragm is adjusted to a given aperture setting during the light measurement by a diaphragm operating member, and the exposure is controlled according to the measured light. In FIGS. 2 and 3, there is provided in the camera body diaphragm operating button 19 engageable with diaphragm operating lever 20 and slidingly movable in the direction of arrow $b$. When diaphragm operating button 19 is in the position as shown in FIG. 2, operating pin 19$a$ is located at the fully retracted position from diaphragm actuating lever 20, and hence diaphragm adjusting ring 24 maintains the diaphragm in the opened condition, unless the release operation is initiated.

However, once diaphragm operating button 19 is urged in the direction of arrow $b$ as shown in FIG. 3, operating pin 19$a$ thereof is brought into engagement with diaphragm actuating lever 20 in the viewing condition, to thereby urge lever 20 in the direction of arrow $a$ against the force of spring 21. This causes the rotation of diaphragm adjusting ring 24 in the clockwise direction by the action of spring 23. Diaphragm adjusting ring 24 rotates until interconnecting pin 22 comes into engagement with projection 4$b'$ of the aperture setting ring to provide a given aperture setting of the diaphragm.

Thus, diaphragm operating button 19 operates in both positions shown in FIGS. 2 and 3.

Lever 25 is rotatably journaled to the camera body by axle 26 and urged in the clockwise direction by spring 27. Lever 25, when diaphragm operating button 19 is in the position of FIG. 2, is maintained out of engagement with operating pin 19$a$, and becomes engaged therewith when diaphragm operating button 19 is in the position of FIG. 3. Lever 25 has pulley 28 rotatably journaled thereto. A third transmission string, one end of which is secured to portion 31 of the camera body, is wound around pulley 28 and extends, via pulleys 29$a$ and 29$b$ journaled to the camera body, around sleeve 14 in the clockwise direction, and is then fastened at the other end to sleeve 14.

Accordingly, when diaphragm operating button 19 is in the position of FIG. 2, the angular position of lever 25 in relation to shaft 26 thereof is determined by the rotation of sleeve 14. When diaphragm operating button 19 is urged in the direction of arrow $b$ to the position of FIG. 3, operating pin 19$a$ urges diaphragm actuating lever 20 and lever 25 in the direction of arrow $a$, whereupon interconnecting pin 22 is released from its engagement with diaphragm actuating lever 20 to thereby be free to rotate in the clockwise direction, whereby diaphragm adjusting ring 24 rotates in the clockwise direction by the action of spring 23 until interconnecting pin 22 is brought into engagement with projection 4$b'$. Thus, the diaphragm is adjusted to the given aperture setting. Simultaneously with the above movement, the rotation of lever 25 causes, by way of third transmission string 30, sleeve 14 to rotate in the counterclockwise direction against the force of spring 12. This causes the counterclockwise rotation of planetary pulley 16 about shaft 10 by means of second transmission string 18, hence the rotation of disc 15 to a reference position, viz., the diaphragm opened position. Accordingly, the angular position of disc 15 is determined only by the angular position of film sensitivity setting pulley 17, irrespective of the aperture setting, hence no information regarding the aperture setting is fed to the light measuring device.

This serves to eliminate the resistance variation of variable resistor R$x$ or $r$1, depending upon the aperture setting, due to the fact that since at the time of light measurement the diaphragm has been adjusted to the aperture setting, and light rays coming through the aperture are received by light receiving element P, the aperture setting is fed to light receiving element P, and therefore the aperture setting has been included in the light measuring outputs.

Figure 6:
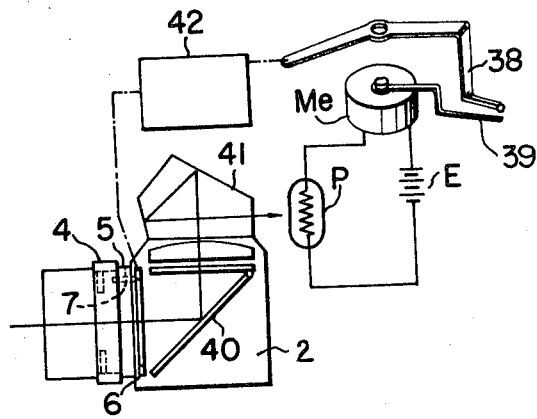
FIG. 6 is a block diagram showing an example of a light measuring device.

FIG. 6 shows an embodiment in which the exposure data is provided by meter M$e$ and supplementary pointer 38. With regard to the operation of the supplementary pointer 38 in relation to pointer 39 of meter M$e$, the aperture setting data is fed to pointer 38 or cut off therefrom by converting mechanism 42 as shown in FIGS. 2 and 3, depending upon the photographing system used, viz., either the first mentioned photographing system in which the diaphragm is in the opened position at the time of light measurement, or the second mentioned photographing system in which the diaphragm is adjusted to the aperture setting and then light measurement is effected, thus ensuring a correct indication of exposure by the pointer.

Meter 14 is connected in series to power source E and light receiving element P for use in receiving field light rays passing through the photographing lens and the diaphragm.

Accordingly, in the first mentioned photographing system in which the light measurement is effected as the diaphragm is maintained in the opened condition, since the film sensitivity and aperture settings data have been fed to supplementary pointer 38 in converting mechanism 42 as shown in FIG. 2, the time of exposure is indicated by aligning the supplementary pointer with that of pointer 39 of meter Me, and the indicated exposure time represents the case wherein the diaphragm is adjusted to the aperture setting at the time of exposure.

In the second mentioned photographing system in which the diaphragm is adjusted to the aperture setting at the time of light measurement, since the aperture setting data has been fed to light receiving element P, diaphragm operating button 19 as shown in FIG. 3 excludes the aperture setting data from being further fed to supplementary pointer 38.

Figure 7:
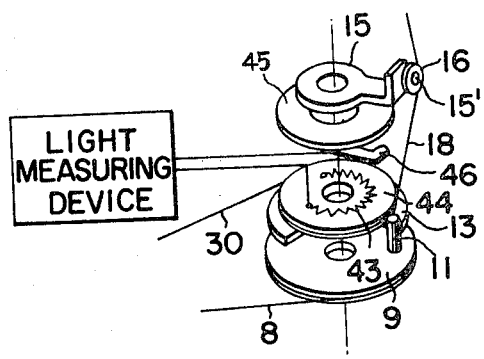
FIG. 7 is a perspective view exemplifying the relationship of a converting mechanism with the light measuring device.

FIG. 7 shows a construction wherein the rotational angle of disc 15 is fed to the light measuring device in FIGS. 4 and 5 by the rotation of planetary pulley 16 about shaft 10 in FIG. 2. Variable resistor Rx of FIG. 4 or variable resistor r1 of FIG. 5 is printed on disc plate 44 coaxially and integrally with diaphragm adjusting plate 13, such resistor being designated by resistor 43. Disc 45, coaxial and integral with disc 15, is provided with brush 46, which slides on resistor 43; brush 46 and one end of resistor 43 are respectively connected to the light measuring device, as resistor Rx or resistor r1 of the light measuring device.

Figure 8:
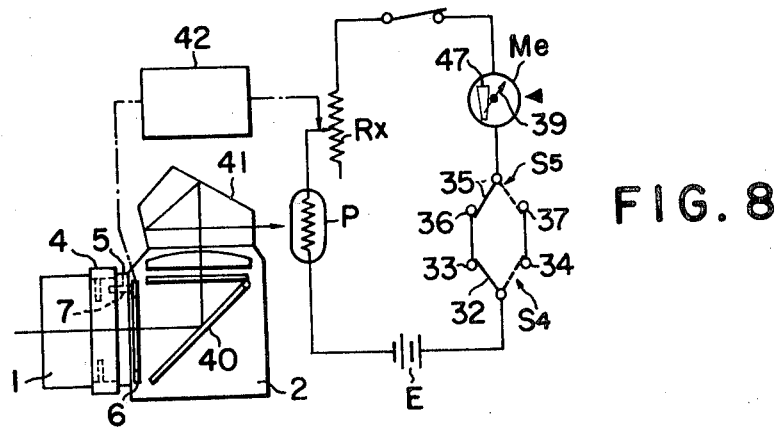
FIG. 8 is a diagram of an exemplary warning circuit.

With further reference to the converting mechanism as shown in FIGS. 2 and 3 in conjunction with the light measuring device shown in FIG. 8, and assuming the coexistence of the interchangeable lens provided with meter couplers 5a and 5b and the interchangeable lens having no coupler, in order to effect light measurement as the aperture of the interchangeable lens is maintained open, if diaphragm operating button 19 is retracted from diaphragm actuating lever 20 as shown in FIG. 2, if follows that no aperture setting data will be fed to the light measuring device, either by the diaphragm or by converting mechanism 42. Consequently, if the exposure should be controlled under such conditions, there would be an error in the exposure.

A warning of such an erroneous operation may be provided, as shown in FIGS. 2 and 3, by projection 19b of diaphragm operating button 19, switch S4 having movable contact 32 switched between contact 33 and contact 34 according to the shift of projection 19b from the first position of FIG. 2 to the second position of FIG. 3, projection 13b formed on diaphragm adjusting disc plate 13, and switch S5 having movable contact 35 switched from contact 36 to contact 37, according to the shift of diaphragm adjusting disc plate 13 from the first position of FIG. 2 to the second position of FIG. 3. Both switches S4 and S5, as shown in FIG. 8, are connected to the light measuring consisting of meter Me, variable resistor Rx, light receiving element P and power source E. The light measuring circuit is normally cut off and actuated either when movable contact 32 of switch S4 is connected to contact 33 and movable contact 35 of switch S5 is connected to contact 36, or when movable contact 32 of switch S4 is connected to contact 34 and movable contact 35 of switch S5 is connected to contact 37.

With such an arrangement using an interchangeable lens having meter couplers, and when diaphragm operating button 19 is in the first position shown in FIG. 2, the meter circuit is closed as shown by the full lines in FIG. 8. Furthermore, if the interchangeable lens has no meter coupler and the light measurement is effected after adjusting the diaphragm aperture setting, both switches S4 and S5 are switched to the positions shown by the dotted line, thus completing closure of the meter circuit.

On the contrary, provided that the interchangeable lens has no meter coupler, because movable contact 35 of switch S5 is connected to contact 34 as shown by the dotted line, the meter circuit is completed only in the case where the light measurement is effected after the diaphragm is adjusted to the aperture setting in which case contact 32 of switch S4 is connected to contact 34. When movable contact 32 of switch S4 is connected to contact 33 so as to effect the light measurement with the diaphragm maintained in the opened condition, the meter circuit is opened; hence pointer 39 vibrates at the zero position, indicating that measurement is impossible.

The light measurement in this case may be such that the shutter speed data has been performed by converting mechanism 42, or of the type wherein pointer 39 is used as a meter for indicating the shutter speed.

It will be understood by those skilled in the art that various changes and modifications may be made without departing from the spirit or the scope of the claims of this invention.

What is claimed is:

1. A single lens reflex camera comprising:
   a camera body;
   an objective lens detachably mounted on said camera body, and including a diaphragm aperture means, a manually operable aperture setting means and diaphragm adjusting means adaptable to follow the movement of said aperture setting means;
   light measuring means for measuring field light rays passed through said objective lens;
   first changing means movable between a first position for maintaining said diaphragm aperture means fully opened and a second position for setting said diaphragm adjusting means to the preset value of said aperture setting means, said first changing means being biased in said first position;
   first interlocking means movable with the operation of said aperture setting means;
   second interlocking means for interlocking with said first interlocking means and for transmitting the setting of said aperture setting means to said light measuring means;
   second changing means movable between a first position for enabling said second interlocking means to follow said first interlocking means and a second position for releasing said second interlocking means from following said first interlocking means, said second changing means being biased into said first position; and
   manually operable means to move said first changing means and said second changing means from said first to said second position.

2. A light measuring system as in claim 1, wherein said second interlocking means transmits the exposure data to said light measuring means with said first changing means in said first position and said second position.

3. A single lens reflex camera as in claim 1, wherein said light measuring means includes a light receiving element, said first and second changing means, said first and second interlocking means and said manually operable means form a converting mechanism, and further comprising:
   a transistor connected in series with said light receiving element;
   a variable resistance for varying the base potential of said transistor and controlled by said converting mechanism according to the aperture setting;
   a switch closed when the camera is in the viewing condition and opened when the camera is in the photographing condition; and
   means for storing the output of said light receiving element through said switch.

4. A single lens reflex camera as in claim 1, wherein said light measuring means includes a light receiving element and further comprising:
   a light measuring circuit for generating a light measuring output voltage from said light receiving element;
   a switch closed when the camera is in the viewing condition and opened when the camera is in the photographing condition;
   means for storing said light measuring output voltage through said switch;
   a differential amplifying circuit including a first transistor having a base connected to said means for storing and a collector connected to a variable resistance, and a second transistor connected to a capacitor and a resistance connected in series with each other and having a base and emitter connected to said capacitor to form an integrating circuit actuated simultaneously with the commencement of exposure;
   an electromagnet for terminating the exposure; and
   means for adjusting said variable resistance and responsive to said second interlocking means.

5. A single lens reflex camera as in claim 1, wherein said light measuring device includes,
   a meter circuit including a power source, a variable resistance and a meter connected in series with one another; and
   means for adjusting said variable resistance and responsive to said second interlocking means.

6. A single lens reflex camera as in claim 1, further comprising:
   an interchangeable lens mounted on the camera including means for transmitting the aperture setting.

7. A single lens reflex camera as in claim 6, further comprising:
   a coupling means rotatably mounted to the camera body and engaging with said aperture setting means when said interchangeable lens is mounted to the camera;
   a first rotatable disc loosely fitted to a shaft and rotating in association with the movement of said coupling means;
   a second rotatable disc loosely fitted to said shaft and biased to rotate by a spring together with said first disc in engagement therewith;
   a third rotatable disc loosely fitted to said shaft and having an angular position determined by the film sensitivity setting;
   a fourth rotatable disc loosely fitted to said shaft and rotating to a position determined by the rotation of said second disc and third disc differentially transmitted thereto;
   means for feeding the angular rotation of said fourth disc to said light measuring device; and
   means engaging said first changing means to be biased to a given position when said first changing means is in said second position, thereby releasing the engagement between said second disc and first disc, whereby said second disc rotates to a given position relative to said shaft.

8. A single lens reflex camera as in claim 7, further comprising:
   a variable resistance having a resistance determined in association with the relative rotation of said fourth disc and said second disc.

9. A single lens reflex camera as in claim 8, wherein said light measuring device includes at least a power source, a meter, a first switch and a second switch which are connected in series with one another; and further comprising:
   means for connecting a movable contact of said first switch to a first contact thereof when said first changing means is in said first position ;and for connecting said movable contact to a second contact of said first switch when said first changing means is in said second position;
   means adapted to connect a movable contact of said second switch to a third contact thereof when said aperture setting means is set to an aperture setting other than full aperture and said coupling means and said aperture setting means are connected, and for connecting said movable contact of said second switch to a fourth contact thereof when said aperture setting means are set to full aperture and said aperture setting means and coupling means are disengaged;
   means for rendering said first contact and third contact conductive; and
   means for rendering said second contact and said fourth contact conductive.

* * * * *